United States Patent [19]

Hobson, Jr.

[11] 4,172,271

[45] Oct. 23, 1979

[54] FUSIBLE CIRCUIT INTERRUPTER WITH GROUND FAULT CIRCUIT PROTECTION

[75] Inventor: Charles F. Hobson, Jr., Southington, Conn.

[73] Assignee: General Electric Company, New York, N.Y.

[21] Appl. No.: 904,101

[22] Filed: May 8, 1978

[51] Int. Cl.² .............................................. H02B 1/04
[52] U.S. Cl. ..................................... 361/347; 361/44; 361/46; 361/335; 361/360
[58] Field of Search .......................... 335/6; 337/6, 8; 361/44, 45, 46, 331, 334, 335, 343, 346–349, 357, 360, 430, 431

[56] References Cited

U.S. PATENT DOCUMENTS

| 3,745,415 | 7/1973 | Polley ....................................... | 361/46 |
| 3,869,649 | 3/1975 | Hobson, Jr. ............................. | 361/46 |
| 3,898,537 | 8/1975 | Mayse ..................................... | 361/334 |

Primary Examiner—Gerald P. Tolin
Attorney, Agent, or Firm—Robert A. Cahill; Walter C. Bernkopf; Philip L. Schlamp

[57] ABSTRACT

A circuit interrupter is secured to a mounting pan together with an insulative block in turn mounting a transverse array of fuse load terminals in individual, spaced alignment with associated interrupter load terminals. A differential current transformer is mounted to the pan with its window located in the space between the interrupter and fuse load terminals. Plural fuses extend through the transformer window with their opposed end terminals in respective electrical connection with associated interrupter and fuse load terminals, whereby the transformer monitors the vectorial sum of the phase currents flowing through the fuses.

3 Claims, 2 Drawing Figures

FUSIBLE CIRCUIT INTERRUPTER WITH GROUND FAULT CIRCUIT PROTECTION

BACKGROUND OF THE INVENTION

Increasing emphasis is being placed on the protection of industrial power distribution circuits against the damaging consequences of ground faults. Typically, the magnitude of current flowing through phase to ground faults is too low to produce an early response by conventional overcurrent sensing means incorporated in circuit protective devices such as circuit breakers. The majority of ground faults are initially attended by arcing which in time causes extensive damage at the site of the fault before escalating to fault currents of overcurrent proportions.

To sense the presence of ground faults on an electrical distribution circuit, the conventional approach is to monitor the vectorial sum of the currents flowing in the various distribution circuit conductors pursuant to determining whether or not all of the current flowing to the load via these conductors is returning to the source via these same conductors. If not, then the resulting imbalance must be occasioned by current returning to the source by an unintended circuit path, typically a ground circuit path. To implement this approach, a differential or so-called "zero sequence" current transformer is normally utilized. This transformer includes a core situated in embracing relation with the distribution circuit conductors and on which is wound a multi-turn secondary winding. Should the vectorial sum of the currents flowing in these conductors not equal zero, a fault signal is developed in the secondary winding which is proportional in magnitude to the differential of the vectorial sum from zero. This fault signal is fed to a ground fault signal processor pursuant to initiating the execution of a ground fault trip function by a suitably equipped circuit interrupter.

In the case of high current, polyphase industrial power distribution circuits, the individual circuit conductors are necessarily quite large in cross-section and separated from each other for requisite interphase clearance. Consequently, the core of a differential current transformer must be quite large in order to embrace all of the phase conductors. In the close confines of industrial switchboards, the installation of a differential current transformer presents a considerable packaging problem. This is particularly so in the case of fusible circuit interrupters where space problems are exacerbated by the presence of a plurality of fuses typically of quite large physical size.

It is accordingly an object of the present invention to provide a ground fault circuit interrupter of compact physical size.

A further object of the present invention is to provide a fusible ground fault circuit interrupter of the above character.

Other objects of the present invention will in part be obvious and in part appear hereinafter.

SUMMARY OF THE INVENTION

In accordance with the present invention, there is provided a fusible, polyphase circuit interrupter, such as trippable switch or non-automatic circuit breaker, which is secured to a mounting pan having an extended portion situated beyond the interrupter load terminals. An insulative block, secured to the extended pan portion, mounts a transverse array of fuse load terminals in spaced, respectively aligned relation with associated interrupter load terminals. A differential current transformer is mounted to the extended pan portion at a location intermediate the interrupter and fuse load terminals, rather than downstream from the fuse load terminals as has been the practice heretofore. Plural fuses are electrically connected and physically mounted at their opposed end terminals to associated interrupter and fuse load terminals with their bodies extending through the open interior or window of the differential current transformer core. A multi-turn secondary winding wound on this core is wired into electronic ground fault trip circuitry operating to initiate automatic opening of the interrupter contacts in response to a signal developed in this secondary winding, as occasioned by an imbalance in the currents flowing through the fuses. To accommodate the portion of the transformer core extending across the back sides of the fuses, the mounting pan is provided with a transverse opening through which that portion of the core protrudes. By virtue of this unique construction, provided by the present invention, the additional space required to adapt a fusible circuit interrupter with ground fault circuit protection capability is held to an absolute minimum, thus facilitating the installation thereof in the close confines of industrial switchboards and panelboards as presently designed.

The invention accordingly comprises the features of construction and arrangement of parts which will be exemplified in the construction hereinafter set forth, and the scope of the invention will be indicated in the claims.

For a better understanding of the nature and objects of the invention, reference should be had to the following detailed description taken in conjunction with the accompanying drawing, in which:

FIG. 1 is a perspective view of a fusible circuit interrupter equipped with ground fault circuit protection in accordance with the present invention; and FIG. 2 is a plan view, partially broken away, of the lower portion of the fusible circuit interrupter of FIG. 1.

Like reference numerals refer to like parts throughout the several views of the drawing.

DETAILED DESCRIPTION

Figure 1:
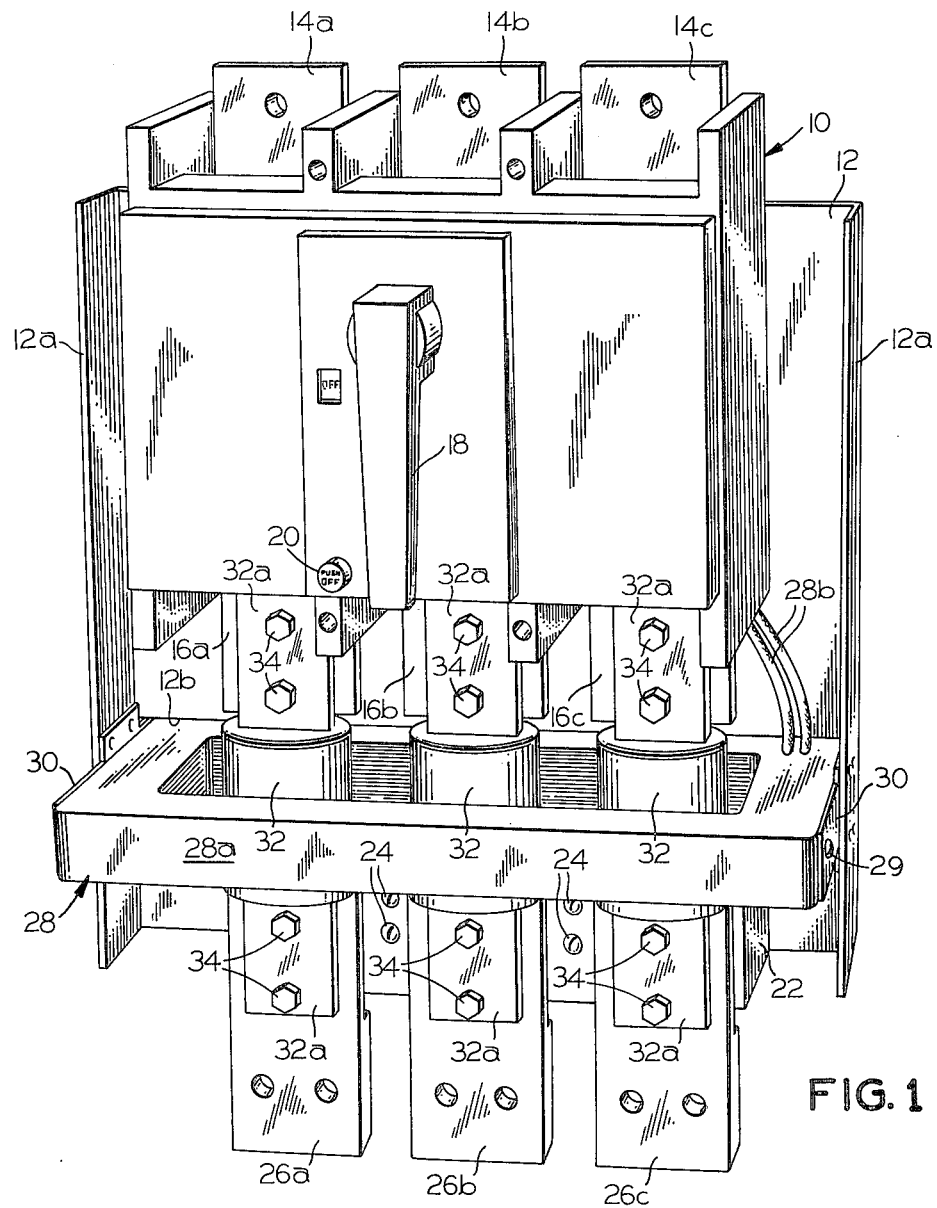

Referring to FIG. 1, a fusible circuit interrupter, generally indicated at 10, is affixed by suitable means to a vertically elongated mounting pan 12 facilitating installation in an industrial switchboard, not shown. The circuit interrupter may take the form of a non-automatic circuit breaker, such as an HPC High Pressure Contact switch offered by the Circuit Protective Devices Department of the General Electric Company. The circuit interrupter, illustrated as a polyphase device, includes three line terminal straps 14a, 14b and 14c and three respectively associated load terminal straps 16a, 16b and 16c. A trippable operating mechanism (not shown) is articulated by a manual operating handle 18 pursuant to closing the interrupter internal contacts, while a pushbutton 20 mechanically coupled with a latch (not shown) is depressed to unlatch or trip the operating mechanism and thereby effect opening of the interrupter internal contacts.

Figure 2:
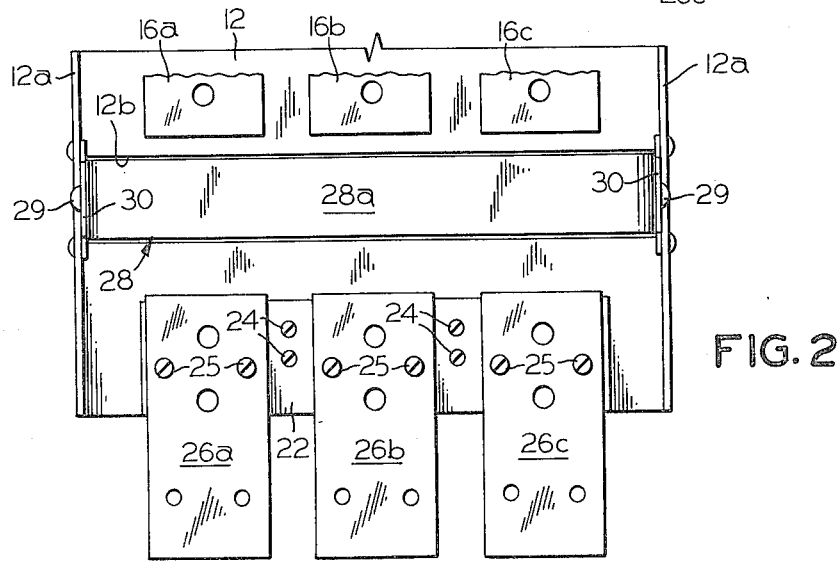

As seen in FIGS. 1 and 2, a transversely elongated, insulative block 22 is secured to the lower end of pan 12 by screws 24. Secured to this block by screws 25 are three fuse load terminal straps 26a, 26b and 26c in respective, vertically spaced alignment with associated interrupter load terminal straps 16a, 16b and 16c. In this space between the transverse arrays of interrupter and fuse load terminal straps, the pan 12 mounts a differential current transformer, generally indicated at 28, consisting of an open rectangular core 28a wound with a multi-turn secondary winding (not shown) whose terminations are wired via leads 28b to a ground fault signal processor (not shown) accommodated within the interrupter case. The wound core 28a is encased in a potting compound in which is embedded tapped bushings (not shown) for accepting screws (one seen at 29 in FIG. 1) pursuant to mounting the transformer to a pair of side brackets 30 secured to forwardly turned sidewalls 12a of mounting pan 12. For some frame sizes it may be necessary to provide a transverse opening 12b in the pan, extending from sidewall to sidewall, for accommodating the protrusion therethrough of the rear portion of transformer core 28a.

As seen in FIG. 1, a barrel fuse 32 having opposed end terminal straps 32a is electrically connected by bolts 34 between each of the associated interrupter and fuse load terminal straps 16a and 26a, 16b and 26b, and 16c and 26c. The bodies of these three fuses are accommodated in the open interior or window 28c of transformer core 28a. Appropriate fuses for use in the present invention are Class L fuses offered by a number of manufacturers including the General Electric Company.

From the foregoing description, it is seen that differential current transformer 28 is positioned to monitor the instantaneous vectorial sum of the three phase currents respectively flowing through the three fuses 32. If this summation is zero, meaning that all of the current flowing to the load through the fuses is returning to the source through the fuses and thus there is no current differential or imbalance, the flux developed in the core by these phase currents cancels out, leaving no residual flux to induce a ground fault signal in the transformer secondary winding. However, if this summation is not zero, signifying a ground fault on the distribution circuit fed through circuit interrupter 10, a ground fault signal is induced in the transformer secondary winding. This signal is supplied via leads 28b to the ground fault signal processor within the circuit interrupter. If this signal exceeds pre-established magnitude and duration thresholds, the signal processor precipitates the electrical activation of a suitable electromechanical device, such as a flux-shifter (not shown), which operates to defeat the operating mechanism latch with consequent opening of the interrupter cntacts, all in conventional fashion.

While it is contemplated that the ground fault signal processor be integral with the circuit interrupter, such as in the case of the type THP Ground Fault Programmer offered by the General Electric Company, it will be understood that the processor can be an external component in the form of a ground fault relay, such as offered by the General Electric Company under the trademark GROUND BREAK.

Heretofore, the differential current transformer was mounted independently of the fusible circuit interrupter in embracing relation with the distribution circuit phase conductors at a location just downstream from the fuse load terminal straps. Frequently, finding space in the close confines of an industrial switchboard to so mount the differential current transformer was difficult. By virtue of the present invention, the differential current transformer is mounted in embracing relation with the fuses, thereby providing a more compact assembly. This is achieved without an increase in the most significant dimension in terms of installation, i.e., the vertical distance between the interrupter line terminals and the fuse load terminals. Since the differential current transformer is factory assembled with the circuit interrupter, shipment and installation are facilitated. Moreover, field replacement of the differential current transformers is considerably more convenient by virtue of the present invention, since this entails mere removal of the fuses, as contrasted to removal of the circuit interrupter and/or switchboard buswork in the past. I have also discovered that ground fault signal error is reduced due to improved coupling of the phase currents with the transformer core occasioned by the distribution of the phase currents within the fuse bodies.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Ground fault protection apparatus comprising, in combination:
    A. A mounting member;
    B. A polyphase circuit interrupter affixed to said mounting member and having plural line and plural load terminals;
    C. a plurality of fuse load terminals supported by said mounting member in respectively aligned, spaced relation to associated interrupter load terminals;
    D. a differential current transformer supported by said mounting member in the space intermediate said interrupter and fuse load terminals, said transformer including a core having an open interior defining a window; and
    E. plural fuses each having opposed end terminals, said fuses extending through said window and respectively connected at their end terminals to associated interrupter and fuse load terminals.

2. The apparatus defined in claim 1, which further includes an insulative block secured to said mounting member, said fuse load terminals affixed to said insulative block.

3. The apparatus defined in claim 2, wherein said mounting member includes a transversely elongated opening accommodating the protrusion therethrough of that portion of said transformer core situated intermediate said fuses and said mounting member.

* * * * *